(12) United States Patent
Chen et al.

(10) Patent No.: US 7,089,356 B1
(45) Date of Patent: Aug. 8, 2006

(54) DYNAMIC AND SCALABLE PARALLEL PROCESSING OF SEQUENCE OPERATIONS

(75) Inventors: Rushan Chen, Belmont, CA (US); Bhaskar Ghosh, Burlingame, CA (US)

(73) Assignee: Oracle International Corporation, Redwood Shores, CA (US)

( * ) Notice: Subject to any disclaimer, the term of this patent is extended or adjusted under 35 U.S.C. 154(b) by 608 days.

(21) Appl. No.: 10/302,207

(22) Filed: Nov. 21, 2002

(51) Int. Cl.
*G06F 12/06* (2006.01)
(52) U.S. Cl. ..................................................... 711/113
(58) Field of Classification Search ................ 711/113, 711/122
See application file for complete search history.

(56) References Cited

U.S. PATENT DOCUMENTS

| | | | |
|---|---|---|---|
| 5,742,806 A * | 4/1998 | Reiner et al. ................... | 707/3 |
| 5,802,563 A * | 9/1998 | Hagersten et al. .......... | 711/122 |
| 5,943,685 A * | 8/1999 | Arimilli et al. ............. | 711/146 |
| 6,301,258 B1 * | 10/2001 | Katseff et al. .............. | 370/412 |

OTHER PUBLICATIONS

Jim Grey, et al., Quicky Generating Billion-Record Synthetic Databases, ACM SIGMOD May 1994, pp. 243-252.*
Oracle, "Oracle9i SQL Reference, Release 2 (9.2), Part No. A96540-01, SQL Statements: Create Library to Create SPFILE, 15 of 16," 2002, 5 pages.
Oracle, "Oracle9i SQL Reference, Release 2 (9.2), Part No. A96540-01, Basic Elements of Oracle SQL, 6 of 10," 2002, 7 pages.
Oracle, "Oracle7 Parallel Server Concepts and Administrator's Guide, Oracle Database Architecture for the Parallel Server," 1996, 9 pages.
Oracle, "Oracle7 Parallel Server Concepts and Administrator's Guide, Overview of Locking Mechanisms," 1996, 11 pages.

* cited by examiner

*Primary Examiner*—Pierre Bataille
*Assistant Examiner*—Paul Schlie
(74) *Attorney, Agent, or Firm*—Hickman Palermo Truong & Becker LLP; John D. Henkhaus

(57) ABSTRACT

A method is described for parallel processing of sequence operations, in which contention for the sequence operation is reduced among multiple parallel processes. Contention is reduced by caching sequence values locally for each parallel process. Each process accesses the sequence operation, or an instance level cache of sequence values, in a batched manner, thereby returning a block of unique sequence values instead of a single sequence value. The block of sequence values, or at least information that indicates a range of sequence values that define the block, is then cached locally in association with a given process of the multiple processes. Hence, future requests for sequence values from the given process are serviced from the local cache, rather than having to access the sequence operation and risk contention for the operation with other processes.

26 Claims, 4 Drawing Sheets

DYNAMIC AND SCALABLE PARALLEL PROCESSING OF SEQUENCE OPERATIONS

FIELD OF THE INVENTION

The present invention relates generally to database management systems and, more specifically, to techniques for parallel processing of sequence operations.

BACKGROUND OF THE INVENTION

In many implementations, a sequence is a schema object that can generate unique sequential values. Sequence objects are commonly used by database applications to generate primary and unique keys while loading or scanning data tables, or to generate timestamps, for example. Sequence objects encapsulate a method for generating the next value of a sequence. For example, a primitive NEXTVAL is used in database applications from Oracle Corporation. Using Oracle syntax, a NEXTVAL operation on sequence SEQ is referred to as SEQ.NEXTVAL.

The NEXTVAL operation on a sequence generates the next unique value in an ascending or descending order, depending on the sequence definition. For example, a sequence can be created and implemented using the following SQL statements:

CREATE SEQUENCE SEQ START WITH 0 INCREMENT 1;
SELECT c1, c2, SEQ.NEXTVAL FROM TAB.

The first line creates a sequence called SEQ, which starts with the number zero as the first value of the sequence and increments each successive value of the sequence by one. The second line applies the NEXTVAL operation of sequence object SEQ to each row fetched from table TAB. That is, it attaches a new next value, incremented by one from the previous value, to each row consisting of c1 and c2 from table TAB.

Significantly, a sequence object is globally accessible by several sessions, and thus several users, in a database instance. Hence, to ensure the uniqueness of each sequence value generated for each session call to the sequence object, NEXTVAL operations on the same sequence object are serialized across all processes using a synchronization primitive, for example, a lock.

In a common data-warehousing scenario, multiple processes accessing the same sequence object can be a coordinator process or slave processes spawned by the coordinator. Generally, a parallel query is executed by a coordinator process which spawns the slave processes. For example, the following SQL statement spawns 100 slave processes, which scan the table TAB in parallel, with each process requesting generation of a unique sequence value from the shared sequence object SEQ for each row scanned from table TAB:

SELECT/*+parallel(TAB 100)*/c1, c2, SEQ.NEXTVAL FROM TAB.

The slave processes spawned by the preceding SQL statement synchronize, with respect to the NEXTVAL operation of the sequence object SEQ, using a database instance level lock (referred to further as a K lock). Thus, access to the sequence SEQ is protected and non-trivial contention is thereby encountered. In other words, in accessing the sequence object for requesting a unique sequence value from the sequence, a requesting slave process executing in a given database instance might have to wait for another slave process executing in the same instance, which presently has control of the K lock. Therefore, the more parallelism that is introduced into a query execution, the more contention is introduced for the instance level lock and, consequently, the higher the miss ratio for the lock.

For the foregoing reasons, parallel query execution that requires making parallel calls to a sequence NEXTVAL operation, or a similarly functioning operation, can be highly unscalable. Indeed, the time to complete a given SQL statement that contains a sequence NEXTVAL operation can increase with increasing degrees of parallelism.

In addition, processes from different database instances of the same database also contend for a sequence object when performing NEXTVAL operations. These processes typically synchronize on a cluster level lock (referred to further as an R lock). Hence, a process that is attempting to obtain the next sequence value will first encounter the local instance level K lock and then the cluster level R lock for the sequence object, before gaining access to the sequence object to obtain the next sequence value for that respective instance. In an Oracle database implementation, caching sequence values or numbers inside shared memory associated with a database instance reduces the cross-instance contention described above, by creating a sequence object with a CACHE clause.

Based on the foregoing, it is clearly desirable to provide an improved mechanism for parallel processing in relation to sequence operations.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
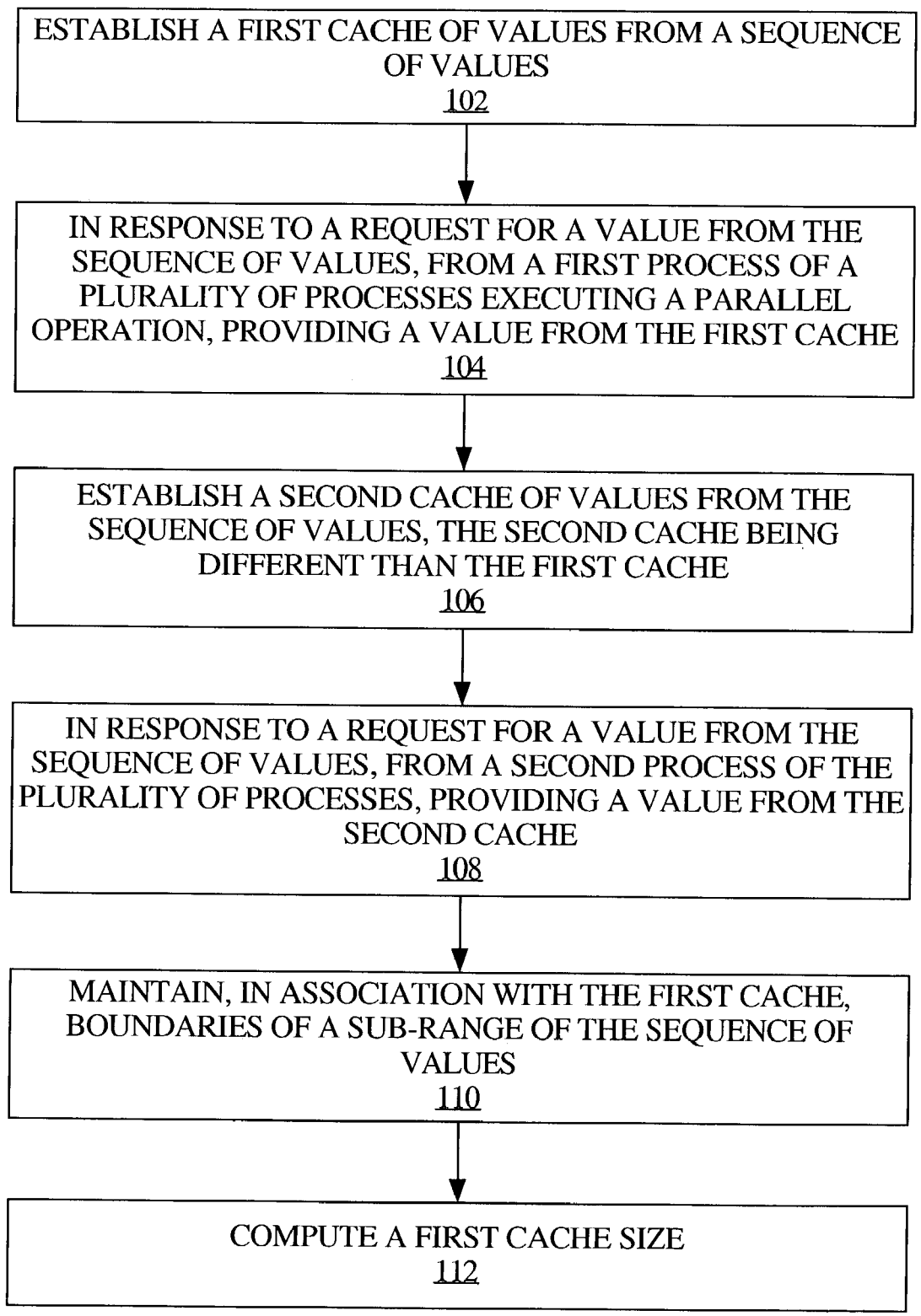
FIG. 1 is a flowchart that illustrates a method for processing sequence operations.

A method and system are described for parallel processing of sequence operations. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A method for parallel processing of sequence operations, in which contention for the sequence operation is reduced among multiple parallel processes, is described herein. Contention is reduced by caching sequence values locally, and privately, for each parallel process. As such, each process accesses the sequence values, or an instance level cache of sequence values, in a batched manner, thereby returning a block of unique sequence values instead of a single sequence value. The block of sequence values, or at least information that indicates a range of sequence values that define the block, is then cached locally in association with a given process of the multiple processes. Hence, future requests for sequence values from the given process are serviced from the local process cache rather than from the instance level sequence cache, which is stored in shared memory and is accessible by each process on that instance. Thus, the risk of contention for a sequence value among processes is reduced.

In one aspect, a method includes, during execution of a parallel operation performed by a plurality of processes, establishing a first cache of values from a sequence of values, which originate from a sequence object. In response to a request from a first process for a value from the sequence of values, the first process is provided a value from the first cache. Further, a second cache of values from the sequence of values is established, the second cache being different than the first cache. Hence, in response to a request from a second process for a value from the sequence of values, the second process is provided a value from the second cache.

In an embodiment, establishment of the first cache of values is in response to a first request from the first process. In another embodiment, the first cache is used to provide sequence values exclusively to the first process, and the second cache is used to provide sequence values exclusively to the second process.

In one aspect, a cache size is computed, which indicates a range of values established for a given cache of sequence values.

In various embodiments, a static cache size is computed as a function of various combinations of an instance cache size associated with a database instance in which the parallel operation is executing and which maintains the sequence of values from which the cache is established, of the number of processes of the multiple parallel processes, and of a cardinality associated with a table on which the parallel operation is executing. In another embodiment, a dynamic cache size is computed considering the sequence service rate, which is the rate at which sequence values are served in response to requests.

A Method for Processing Sequence Operations

FIG. 1 is a flowchart that illustrates a method for processing sequence operations, the steps of which are performed during execution of a parallel operation by a plurality of processes.

At block 102, a first cache of values is established from a sequence of values. For example, from a sequence of ascending integer values from one to one hundred and incremented by one, the values in the range from one to twenty are established as a first cache. Each slave process establishes a cache by storing in its process-private memory, sequence data and metadata to enable local sequence allocation or assignment in response to sequence request calls. Establishing a cache might also include calling a sequence object or routine to request a range of sequential values from the sequence of values. In an embodiment, the first cache of values is established in response to a first request for a value from the sequence of values, from a first process of the plurality of processes.

At block 104, in response to a request from a first process for a value from the sequence of values, a value from the first cache is provided to the first process. Furthermore, the value is a value that has not been previously provided to the first process, i.e., it is a unique value from the sequence of values. For example, upon the first process requesting a sequence value, for uniquely identifying records being loaded into a database table for example, the sequence value "1" is returned to the first process from the first cache. In an embodiment, the first cache is used for providing values exclusively to the first process.

In an embodiment, boundaries of a range of a subset of the sequence of values is stored in a given cache. For example, rather than store a representation of each integer from one to twenty, the first cache might store information that specifies that the range of sequence values available to serve requests for sequence values from the first cache begins with "1", ends with "20", and is incremented by one, e.g., <1,20,1>.

At block 106, a second cache of values is established from the sequence of values. For example, from the sequence of ascending integer values from one to one hundred and incremented by one, the values in the range from twenty-one to forty are established as the second cache. In an embodiment, the second cache of values is established in response to a first request for a value from the sequence of values, from a second process of the plurality of processes.

At block 108, in response to a request from the second process for a value from the sequence of values, a value from the second cache is provided to the second process. Furthermore, the value is a value that has not been previously provided to the second process, i.e., it is a unique value from the sequence of values. For example, upon the second process requesting a sequence value, the sequence value "21" is returned to the second process from the second cache. Furthermore, in an embodiment, the second cache is used for providing values exclusively to the second process.

Hence, a method is provided that reduces or minimizes instances of contention for a sequence value among multiple parallel processes. That is, a lock (K lock) guarding the sequence operation that generates the sequence of values, for example, at a level of a database instance, will not be encountered until a process's local cache of sequence values is exhausted. Thus, authority over the K lock will only be needed for establishing caches for respective processes of the plurality of processes. Contention for a value from a sequence of values associated with a particular database instance is reduced to a level that enables database query statements with sequence operations to be effectively scalable with respect to the number of parallel execution processes. Therefore, with utilization and optimization of respective sequence caches associated with multiple processes, increasingly parallel execution plans will not suffer from increased contention for sequence values among processes and consequent process idle time due to resolution of the contentions, for example, awaiting lock authority and control.

In an embodiment, at optional block 110, boundaries of a sub-range of the sequence of values are maintained in association with the first cache, as previously described. The storage of boundaries of ranges of sequence values in cache, rather than the actual sequence values, is applicable to any or all process caches.

In an embodiment, the first and second processes are associated with a database instance that has established a cache of values from a sequence of values that is shared with at least one other database instance, for example, in a database cluster environment. Further, the first and second caches are established, at block 102 and block 106, from the database instance cache. This embodiment is illustrated in more detail in reference to FIG. 2.

In another embodiment, at optional block 112, a first cache size is computed. A cache size is computed with a goal of specifying an optimal process cache size for a given process and to minimize contention among multiple parallel processes with respect to requests for sequence values. Parameters affecting process cache size are described in more detail below in reference to cache size computation algorithms.

Example Implementation—Database Cluster

Figure 2:
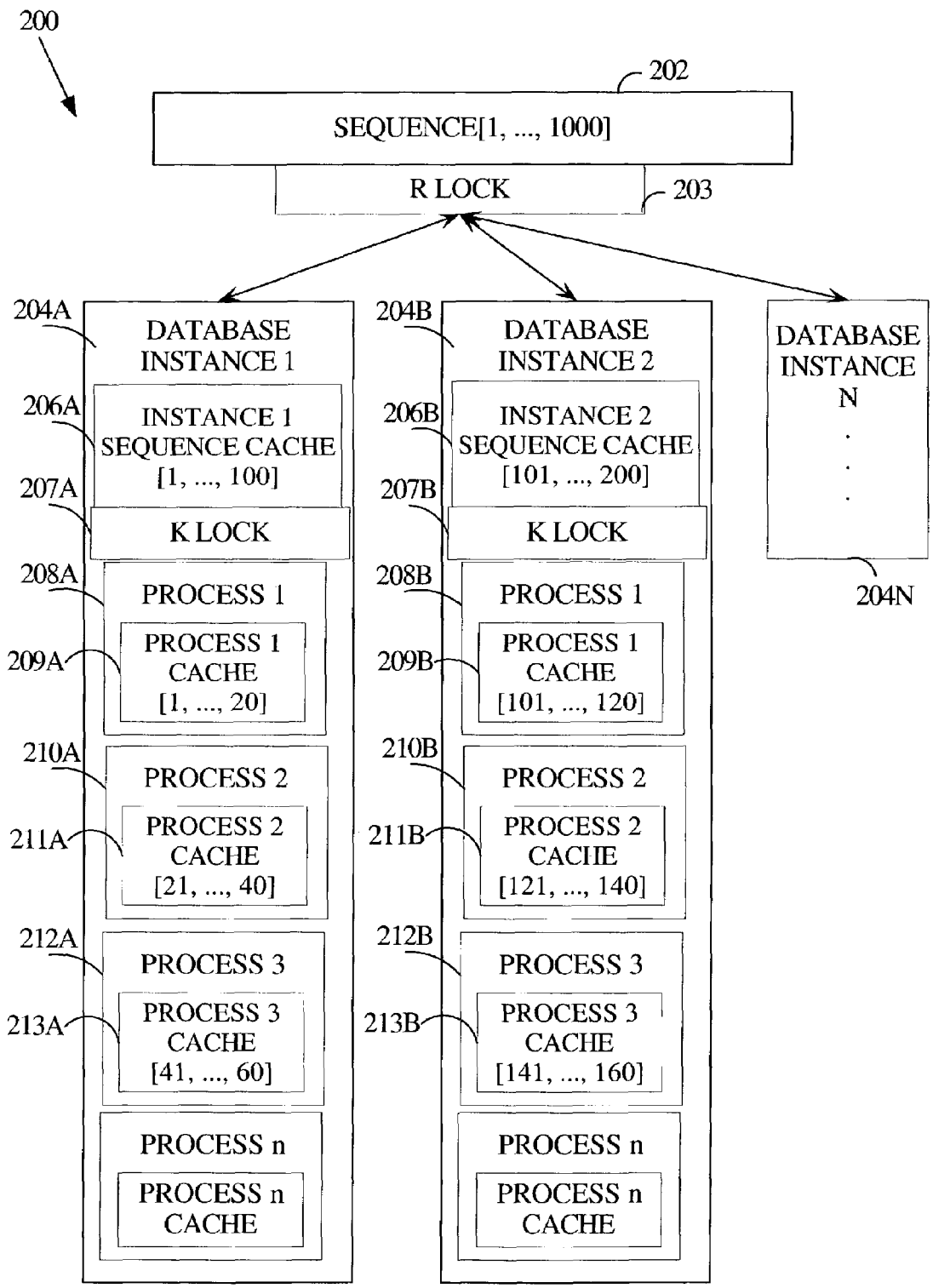
FIG. 2 is a block diagram of a system that illustrates an example implementation of an embodiment.

FIG. 2 is a block diagram of a system 200, which illustrates an example implementation of the techniques described herein, and depicts the relationships between a sequence object, multiple database instances and multiple parallel processes. FIG. 2 illustrates one possible implementation architecture for the techniques described herein, in accordance with an embodiment.

System 200 includes a sequence object 202 or similarly functioning operation, with a corresponding lock 203 (R lock), and a plurality of database instances 204A, 204B, 204N (also known as database servers). Sequence object 202 represents a sequence operation that generates sequential values in response to requests. If implemented using object-oriented programming techniques, which is not a limitation of the invention, the sequence object 202 includes attributes and methods. Non-limiting examples of attributes may include a first sequence value, a last sequence value, a sequence increment, and a current sequence value. A non-limiting example of an encapsulated method is a method to generate or provide the next value in a particular sequence of values. The sequence object 202 depicted in FIG. 2 simply depicts a sequence created to allocate sequential values from one to one thousand in increments of one, which are allocable upon request.

Lock 203 represents a lock to the sequence object 202, which synchronizes access to sequence object 202. In other words, lock 203 locks out or blocks applications from accessing and/or modifying attributes or variables encapsulated in the sequence object 202, thereby ensuring that the sequence of values is correctly allocated. For example, lock 203 prohibits more than one database instance 204A, 204B, 204N, or associated processes, from concurrently accessing and obtaining sequence values from sequence object 202.

System 200 includes a plurality of database instances 204A, 204B, 204N, with N representing any number of database instances that call the sequence object 202, as in a database cluster architecture, for example. Each database instance 204A, 204B, 204N includes an associated instance sequence cache 206A, 206B, 206N (not shown), respectively. For example, instance 204A might call sequence object 202, gain control of the corresponding lock 203, and be allocated a range of sequential values, one to one hundred ([1, ..., 100]), from the sequence of values, one through one thousand ([1, ..., 1000]). Further, instance 204B might call sequence object 202, gain control of the corresponding lock 203, and be allocated a range of sequential values, one hundred one to two hundred ([101, ..., 200]). If instance 204B calls sequence object 202 while instance 204A has control of lock 203, then there is contention that needs to be resolved and instance 204B typically must wait for instance 204A to relinquish control of lock 203.

Each instance cache 206A, 206B, 206N is protected with a lock 207A, 207B, 207N (not shown), respectively. Executing within each database instance 204A, 204B, 204N, are a plurality of processes: 208A, 210A, 212A for instance 204A; 208B, 210B, 212B for instance 204B; and similarly for each instance up to and including instance 204N. The number of the plurality of processes executing within each instance 204A, 204B, 204N need not be the same. In embodiments, the plurality of processes 208A, 210A, 212A and 208B, 210B, 212B, etc., perform a parallel operation within their respective instances 204A, 204B.

According to embodiments, each process 208A, 210A, 212A includes an associated process cache 209A, 211A, 213A, respectively. Processes 208B, 210B, 212B similarly include associated process caches 209B, 211B, 213B. For example, process 208A might call sequence object 202, gain control of the corresponding lock 203, and be allocated a range of sequential values, one to twenty ([1, ..., 20]), from the sequence of values, one through one thousand ([1, ..., 1000]). The sequential values, boundaries of the range of sequential values, or some other representation of the sequential values are stored in local process cache 209A. For example, sequence data and metadata is cached in process memory to enable local sequence allocation or assignment in response to sequence request calls. Further, process 210A might call sequence object 202, gain control of the corresponding lock 203, and be allocated a range of sequential values, twenty-one to forty ([21, ..., 40]). Likewise, these sequential values, boundaries of the range of sequential values, or some other representation of the sequential values are stored in local process cache 211A. If process 210A calls sequence object 202 while process 208A has control of lock 203, then there is contention that needs to be resolved and process 210A typically waits for process 208A to relinquish control of lock 203.

In an embodiment, and as described in reference to FIG. 1, each process 208A, 210A, 212A within instance 204A establishes or populates its respective process cache 209A, 211A, 213A from a sequence of values associated with their database instance 204A. More specifically, the processes call on instance cache 206A, gain control of lock 207A, and request allocation of a block of values from the sequence of values stored in the instance cache 206A. For example, process 208A requests a block of values from the sequence of values one to one hundred ([1, ..., 100]) of instance cache 206A, and is returned the block of values or a representation thereof, one to twenty ([1, ..., 20]). Similarly, process 210A requests a block of values from the sequence of values one to one hundred ([1, ..., 100]) of instance cache 206A, and is returned the block of values or a representation thereof, twenty-one to forty ([21, ..., 40]), and so on with the other processes of the plurality of processes of instance 204A.

Likewise, the processes 208B, 210B, 212B request a block of values from the sequence of values one hundred one to two hundred ([101, ..., 200]) of instance cache 206B, and are returned respective blocks of values. For example, process 208B is allocated values [101, ..., 120]; process 210B is allocated values [121, ..., 140]; process 212B is allocated values [141, ..., 160] and so forth for any other related processes executing within instance 204B or within any other database instances, such as instance 204N.

Through a hierarchy of caching of sequence values, wherein a top level of caching is maintained at the instance level and a lower level of caching is maintained at the process level, a process moves from one level of cache to the next level of cache to obtain a sequence value. That is, a process first attempts to obtain a sequence value from the lower level, or process level, cache. If that is empty, the process continues to the next level of cache, i.e., the instance level cache. If that too is empty, then the process goes to the sequence object directly to obtain a sequence value.

Hence, the rate of contention for a sequence value, among processes executing in parallel within a given instance, is reduced as a result of blocks of sequential values being stored locally in association with each respective process and being served therefrom in response to requests from a given process for a sequence value. Contention for control over locks 207A, 207B, etc., or lock 203 is, therefore, minimized. Consequently, the execution of the parallel operation is less contentious and, therefore, faster and more scalable.

The foregoing description of an example implementation of FIG. 2 is presented for explanatory purposes only. That is, use of embodiments are not limited to the number of database instances, processes, sequential values, etc., depicted in FIG. 2.

Computing Process Cache Size

As described in reference to block 112 of FIG. 1, an optional step in a process for processing sequence operations according to embodiments of the invention is to compute a cache size for a given process of a plurality of processes that perform during execution of a parallel operation. The cache size indicates a range of values from a sequence of values, established as a given process cache. For example, the process caches 209A, 211A, 213A, 209B, 211B, 213B are depicted in FIG. 2 as comprising respective ranges of sequential values spanning twenty values, which were presented for explanatory purposes. These ranges are referred to herein as cache sizes, that is, each process depicted has a cache size of twenty.

Optimizations applicable to the process described in reference to FIG. 1 and the example implementation described in reference to FIG. 2 include optimizations relating to process cache size. Enhanced operational efficiency of the techniques described herein are gained by attempting to optimize process cache sizes so that any given cache does not store and maintain too few or too many values from the sequence of values. Maintaining too few values in a given local process cache results in the need for more calls to associated instance cache (e.g., instance cache 206A of FIG. 2) or to an associated sequence object (e.g., sequence object 202 of FIG. 2), which raises the risk or probability of contention with other processes competing for control of an associated lock (e.g., lock 203 of FIG. 2) or locks (e.g., lock 207A of FIG. 2) via requests for sequence values. Maintaining too many values in a given local process cache could result in non-availability of values should a new process come on line and request a value from the available sequence of values, whereby the request would not be serviced and the process might have to wait until instance cache is replenished with a new range of sequence values.

According to various embodiments, several parameters are considered in computing a preferred cache size. Parameters include, but are not limited to, the following: instance sequence cache size (KC); degree of parallelism (DOP), that is, the number of processes executing in parallel for a given query execution plan; process sequence value service rate (R), which is, generally, the rate at which sequence values can be attached to records; and cardinality of the query result (C). Note that the service rate R is inversely related to how long it takes to receive a sequence value in response to a request and, further, the time it takes to receive the sequence value includes time spent waiting for control of instance lock, such as K lock 207A, 207B, etc. Furthermore, note that cardinality C is likely computed by an optimizer program in forming a query execution plan, and that cardinality can be characterized in more than one manner. In an embodiment, cardinality C is characterized as the number of rows in data tables that are being processed according to a given query, and may be relative to one or more base tables or joined tables. In another embodiment, cardinality C represents an estimate of the number of result rows that may be returned according to a given query.

Static Algorithms

In one embodiment, a static process cache size (SC) is computed as a function of KC and DOP, that is, as a function of an associated instance cache size and the degree of parallelism of the parallel operation (SC=F(KC, DOP)). For example, SC=k*KC/DOP, where k is a constant, e.g., 0.5. This function does not adjust for different sequence service rates, R, for different processes of the plurality of parallel processes executing within a given database instance. Thus, the cache size for each process would be equivalent. This scenario could be wasteful with respect to available sequence values, for one process (e.g., process 208A of FIG. 2) may generate more sequence values than another process within the same instance (e.g., process 210A of FIG. 2), but both process caches (cache 209A and 211A of FIG. 2) would be maintained as the same size. Note that each process working on a parallel operation within an instance is not necessarily assigned the same number of data items to process. One reason is that dynamic load balancing is often used at runtime, and a process which is faster than another process (e.g., because of a difference in associated CPU speeds or I/O wait times) could demand and get a larger set of rows to process.

In one embodiment, a static process cache size (SC) is computed as a function of KC, DOP, and C, that is, as a function of an associated instance cache size, the degree of parallelism of the parallel operation, and cardinality (SC=F(KC, DOP, C)). Assuming that C is a reliable statistic, which can be verified by determining whether the tables underlying the query have been analyzed by an optimizer program, and that C<KC, that is, that the instance cache is already larger than it needs to be, then SC can be set to C/DOP. With perfect load balancing, that is, each process of the plurality of processes is assigned to process the same number of data items, this result would be an optimum static result. Similar to the preceding function, this function does not adjust for different sequence service rates, R, for different processes executing within a given database instance and, therefore, the cache size for each process would be equivalent; perhaps a wasteful scenario.

In one embodiment, a hybrid approach is used which is a hybrid of the two preceding functions, wherein cache size is computed as a function of associated instance cache size, the degree of parallelism of the parallel operation, and cardinality (SC=F(KC, DOP, C)), along with a constant. For example, cache size SC=k*min(C, KC)/DOP, wherein the smaller of cardinality C and instance cache size KC is divided by the degree of parallelism DOP, and multiplied by a constant.

Dynamic Algorithms

In dynamic optimization algorithms related to computing process cache size, the cache size changes depending on a dynamic notion of the sequence service rate R. The goal of a dynamic algorithm is to dynamically adjust the process cache size SC based on whether a given process is encountering more or less contention for a sequence value than in its recent history. With dynamic algorithms, different processes executing within the same database instance can be specified to have different cache sizes, thus, reliance on near-perfect load balancing is not an issue as with some static algorithms. The dynamic algorithm compensates for less-than-perfect load balancing among the multiple processes.

In an embodiment, each process is specified to have a baseline cache size; perhaps a small fraction of KC/DOP. Then it is determined, for a certain number of establishments (or populating) of a given process cache size, how long it takes to establish each respective cache. In other words, how long does it take to return a block of sequence values from the instance cache (or from the sequence object, if appropriate) in response to a request by a respective process. Note that due to locally caching sequence values in association with a given process, the process does not have to establish a new cache of values, that is, request a block of sequence values from the instance cache or sequence object, until it has exhausted its current cache of sequence values.

It is then determined whether how long it takes to establish each respective cache is increasing or decreasing over time, for the number of establishments for which the time to establish is determined. If the amount of time it takes to establish a process cache is increasing, then the cache size is specified to be some size that is larger than the baseline size. In other words, the process is experiencing too much contention at the associated sequence lock due to it having to return to the lock too frequently because its associated local cache is too small. In addition, contention could be due to lock overload because other processes are returning to the lock too frequently because their associated caches are too small.

On the other hand, if the amount of time it takes to establish a process cache is decreasing, then the cache size is specified to be some size that is smaller than the baseline size. In other words, the process is not experiencing enough contention at the associated sequence lock to warrant the baseline cache size because it is not returning to the lock very frequently because its associated local cache is larger than necessary. Again, if the cache size is larger than necessary, the sequence operation is not being utilized as efficiently as possible and therefore resources are being wasted. If the amount of time it takes to establish a process cache is remaining relatively stable, then the baseline cache size is left unchanged.

Figure 3:
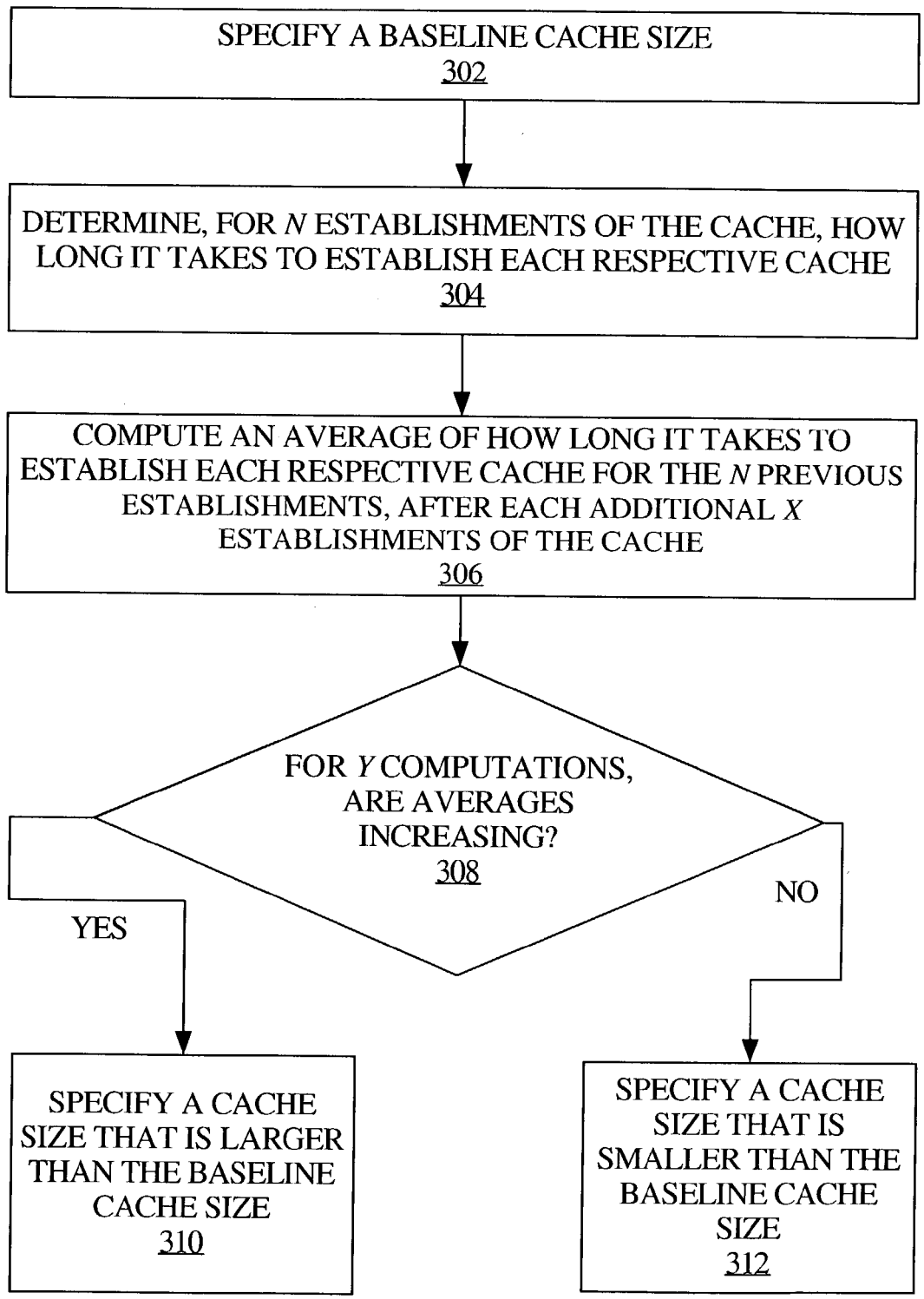
FIG. 3 is a flowchart that illustrates a method for computing a cache size for a cache of values from a sequence of values.

FIG. 3 is a flowchart that illustrates a method for computing a cache size for a cache of values from a sequence of values, wherein a new cache is established in association with a process of a plurality of processes performing a parallel operation each time a current cache of values associated with the process is exhausted. Each process of the plurality f processes establishes a cache by storing in its process-private memory, sequence data and metadata to enable local sequence allocation or assignment in response to sequence request calls. Establishing a cache might also include calling a sequence object, such as sequence object 202 (FIG. 2), or sequence routine to request a range of sequential values from the sequence of values.

At block 302, a baseline cache size is specified, for a given process of the plurality of processes. For example, the baseline cache size may be specified as a small fraction of an instance cache size for a database instance in which the processes are executing, divided by the number of processes of the plurality of processes.

At block 304, for N establishments of the cache for the given process, it is determined how long it takes to establish each respective cache. In other words, how long does it take to return a block of sequence values from the instance cache in response to a request by the given process. The time it takes to establish each respective cache (i.e., an establishment of the cache) is recorded for further computations.

At block 306, an average of how long it takes to establish each respective cache for the given process is computed for the N previous cache establishments. This average is computed after each additional X cache establishments. Hence, a running average of the time to establish N previous caches is maintained in memory and updated every X times that the cache is established. Furthermore, the running averages of how long it took to establish the cache over N times are maintained in memory even after updating.

At decision block 308, for Y computations of the average according to block 306, it is determined whether the running average is increasing or decreasing. If the averages are increasing over Y computations, then a cache size is specified that is larger than the baseline cache size, at block 310, thereby representing the desire for fewer contentions for the instance cache lock among parallel processes and, therefore, more corresponding cached sequence values. If the averages are decreasing over Y computations, then a cache size is specified that is smaller than the baseline cache size, at block 312, thereby representing that the sequence values are not being efficiently distributed to the given process or the plurality of parallel processes.

Another approach to dynamically computing a process cache size resembles a quadratic doubling or exponential back-off methodology. A lower bound and an upper bound are specified for a cache size for a given process. For example, the lower bound is computed as KC/DOP and the upper bound is specified as KC. A baseline cache size SC is specified equal to the lower bound and after each cache associated with the given process is exhausted, the cache size is doubled until it reaches the upper bound. However, a doubling algorithm can waste a significant number of sequence numbers in cases in which there are no more rows to fetch soon after the local cache size is doubled. Thus, any dynamic algorithm should balance how aggressively to increase local cache size and how many sequence numbers can affordably be wasted in a worst case. Alternatively, the baseline cache size is specified equal to the upper bound and after each cache associated with the given process is exhausted, the cache size is halved until it reaches the lower bound.

Implementation Mechanism-Hardware Overview

Figure 4:
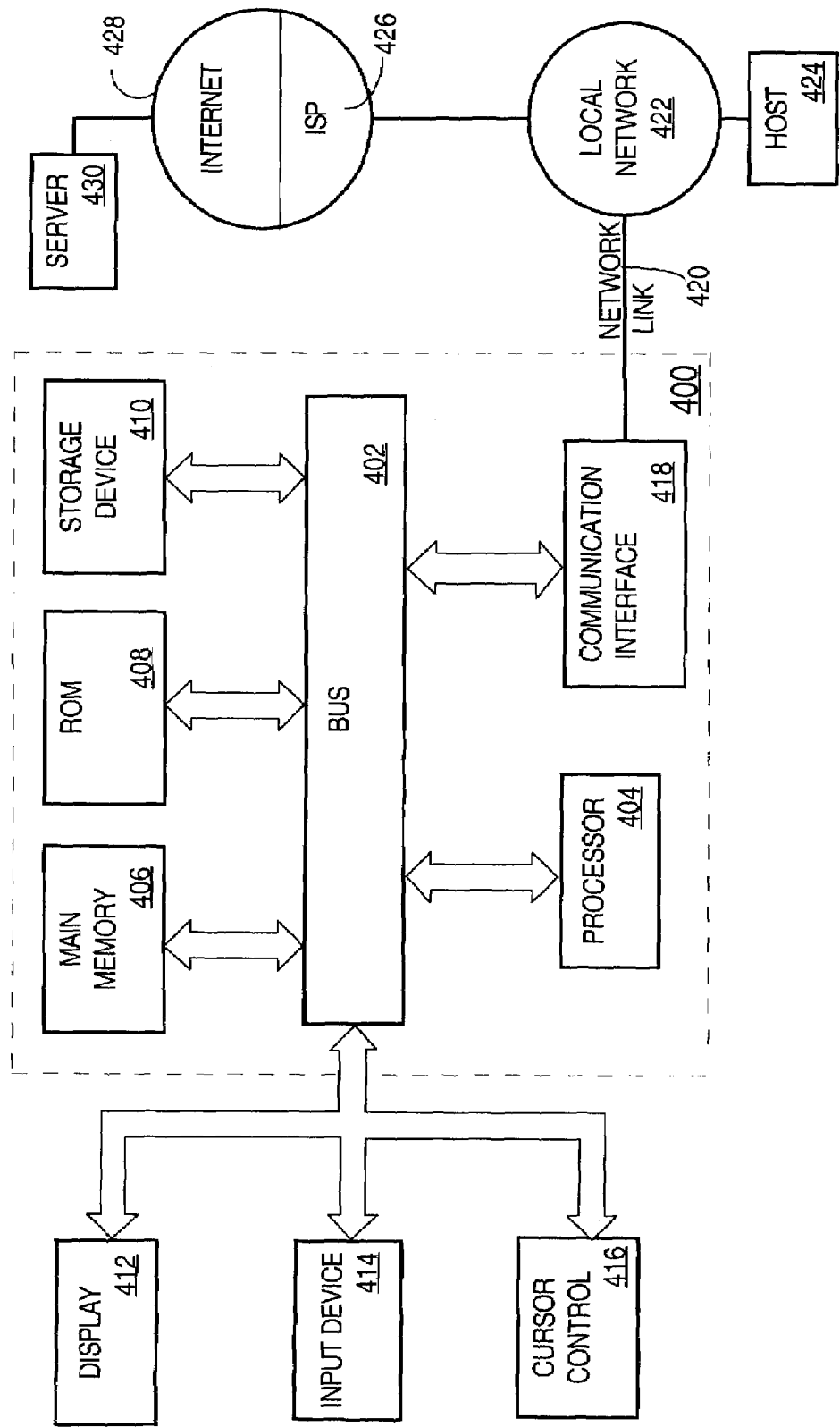
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, or magneto-optical disk, is provided and coupled to bus 402 for storing information and instructions.

Computer system 400 may be coupled via bus 402 to a display 412, such as a cathode ray tube (CRT) or a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical, magnetic, or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, implementations were presented in which SQL is used; however, the techniques described herein are not limited to use with SQL, for other data query languages may be applicable. For another example, additional dynamic algorithms may be developed for computation of a preferred cache size for a process of a plurality of processes performing a parallel operation, taking into account parameters other than those described above; all of which would still fall within the scope of the broad teachings presented herein. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for processing sequence operations, the method comprising the steps of:

during execution of a parallel operation performed by a plurality of processes from a single database instance,
in response to a request from a first process for a value from a sequence of unique values, populating a first process-level cache with a representation of a first set of unique values from the sequence of unique values;
wherein populating the first process-level cache includes obtaining an instance-level lock on an instance-level cache that stores, for all processes of the instance, a representation of the sequence of unique values;
when a first process of the plurality of processes requires a value from the sequence of unique values, the first process obtaining, based on the representation in the first cache, a value that has not previously been provided to the first process;
wherein the first process-level cache is used exclusively for storing values representing the first set of unique values for use by the first process;
populating a second process-level cache with a representation of a second set of unique values from the sequence of unique values, the second cache being different than the first cache;
wherein populating the second process-level cache includes obtaining an instance-level lock on the instance-level cache; and
when a second process of the plurality of processes requires a value from the sequence of values, the second process obtaining, based on the representation in the second cache, a value that has not previously been provided to the second process;
wherein the second process-level cache is used exclusively for storing values representing the second set of unique values for use by the second process.

2. The method of claim 1, further comprising the step of: maintaining, in association with the first cache, data that defines a sub-range of the sequence of unique values.

3. The method of claim 1, wherein the first and second processes are associated with a database instance that has established a cache of a representation of values from a sequence of unique values, wherein the sequence of unique values is shared with at least one other database instance, and wherein the steps of populating the first process-level cache and the second process-level cache include populating the first process-level cache and the second process-level cache from the database instance cache.

4. The method of claim 1, further comprising the step of: computing a first cache size, the first cache size indicating a range of the first set of unique values represented in the first process-level cache.

5. The method of claim 1, further comprising the step of: computing a first cache size, the first cache size indicating a range of the first set of unique values for populating the first process-level cache, wherein the first cache size is computed as a function of the instance-level cache size and the number of processes of the plurality of processes, wherein the instance-level cache is associated with a database instance in which the parallel operation is executing and which maintains the sequence of unique values from which the first process-level cache is populated.

6. The method of claim 1, further comprising the step of: computing a first cache size, the first cache size indicating a range of the first set of unique values for populating the first process-level cache, wherein the first cache size is computed as a function of a cardinality associated with a table on which the parallel operation is executing and the number of processes of the plurality of processes.

7. The method of claim 1, further comprising the step of: computing a first cache size, the first cache size indicating a range of the first set of unique values for populating the first process-level cache, wherein the first cache size is computed as a function of the instance-level cache size, a cardinality associated with a table on which the parallel operation is executing, and the number of processes of the plurality of processes, wherein the instance-level cache is associated with a database instance in which the parallel operation is executing and maintains the sequence of unique values from which the first process-level cache is populated.

8. The method of claim 1, wherein the step of populating the first process-level cache is performed again each time the first process-level cache of a representation of unique values is exhausted, the method further comprising the steps of:

computing a first cache size, the first cache size indicating a range of the first set of values for populating the first process-level cache, by
specifying a baseline first cache size;
determining, for a number of populations of the first process-level cache, how long it takes to populate each respective first process-level cache;
determining whether how long it takes to populate each respective first process-level cache is increasing or decreasing for the number of populations of the first process-level cache; and
if how long it takes to populate each respective first process-level cache is increasing, then specifying the first cache size that is larger than the baseline first cache size; else
if how long it takes to populate each respective first process-level cache is decreasing, then specifying the first cache size that is smaller than the baseline first cache size.

9. The method of claim 1, wherein the step of populating the first process-level cache is performed again each time the first process-level cache of a representation of unique values is exhausted, the method further comprising the steps of:

computing a first cache size, the first cache size indicating a range of the first set of values for populating the first process-level cache, by
specifying a baseline first cache size;
determining, for N establishments of the first process-level cache, how long it takes to populate each respective first process-level cache;
computing an average of how long it takes to populate each respective first process-level cache for the N previous populations, after each additional X populations of the first process-level cache;
determining whether the averages are increasing or decreasing for Y computations of the average; and
if the averages are increasing for the Y computations, specifying the first cache size that is larger than the baseline first cache size; else
if the averages are decreasing for the Y computations, then specifying the first cache size that is smaller than the baseline first cache size.

10. The method of claim 1, further comprising the steps of:
  in response to determining that the first process-level cache does not have any unused values represented,
    obtaining the instance-level lock on the instance-level cache, and
    once the instance-level lock is obtained, obtaining a representation of a plurality of values from the sequence of unique values for re-populating the first process-level cache.

11. The method of claim 1, wherein the step of populating the first process-level cache with a representation of the first set of unique values includes storing within the first process-level cache the first set of unique values.

12. The method of claim 1, wherein the step of populating the first process-level cache with a representation of the first set of unique values includes storing within the first process-level cache data that defines the first set of unique values.

13. A system for providing sequential values, the system comprising:
  one or more database servers that are configured to manage a collection of data;
  a first server cache that is associated exclusively with a first server of the one or more database servers, and that is used to store a representation of a first sequence of unique values;
  a first plurality of processes that perform a parallel operation within the first server;
  a first plurality of process-level caches, each process-level cache from the first plurality of process-level caches being associated with a particular process of the first plurality of processes and being used to store a representation of a sub-range of the first sequence of unique values;
  wherein populating the first plurality of process-level caches includes obtaining a server-level lock on the first server cache that stores, for all processes of the first plurality of processes, a representation of values from the first sequence of unique values; and
  a sequence object that is configured to generate a unique sequential value from a first sub-range that is associated with a first process of the first plurality of processes and for which a corresponding representation is stored in association with a first process-level cache of the first plurality of process-level caches, in response to a request from the first process;
  wherein the sequence object is further configured to generate a unique sequential value from a second sub-range that is associated with a second process of the first plurality of processes and for which a corresponding representation is stored in association with a second process-level cache of the first plurality of process-level caches, in response to a request from the second process;
  a second server cache that is associated exclusively with a second server of the one or more database servers, and that is used to store a representation of a second sequence of unique values that is different than the first sequence of unique values;
  a second plurality of processes that perform a parallel operation within the second server;
  a second plurality of process-level caches, each process-level cache from the second plurality of process-level caches being associated with a particular process of the second plurality of processes and being used to store a representation of a sub-range of the second sequence of unique values;
  wherein populating the second plurality of process-level caches include obtaining a server-level lock on the second server cache that stores, for all processes of the second plurality of processes, a representation of values from the first sequence of values; and
  wherein the sequence object is further configured to generate a unique sequential value from a third sub-range that is associated with a first process of the second plurality of processes and for which a corresponding representation is stored in association with a first process-level cache of the second plurality of process-level caches, in response to a request from the first process of the second plurality of processes.

14. A computer-readable medium carrying one or more sequences of instructions for processing sequence operations, wherein execution of the one or more sequences of instructions by one or more processors causes the one or more processors to perform the steps of:
  during execution of a parallel operation performed by a plurality of processes from a single database instance,
    in response to a request from a first process for a value from a sequence of unique values, populating a first process-level cache with a representation of a first set of unique values from the sequence of unique values;
    wherein populating the first process-level cache includes obtaining an instance-level lock on an instance-level cache that stores, for all processes of the instance, a representation of the sequence of unique values;
    when a first process of the plurality of processes requires a value from the sequence of unique values, the first process obtaining, based on the representation in the first cache, a value that has not previously been provided to the first process;
    wherein the first process-level cache is used exclusively for storing values representing the first set of unique values for use by the first process;
    populating a second process-level cache with a representation of a second set of unique values from the sequence of unique values, the second cache being different than the first cache;
    wherein populating the second process-level cache includes obtaining an instance-level lock on the instance-level cache; and
    when a second process of the plurality of processes requires a value from the sequence of values, the second process obtaining, based on the representation in the second cache, a value that has not previously been provided to the second process;
    wherein the second process-level cache is used exclusively for storing values representing the second set of unique values for use by the second process.

15. The computer-readable medium of claim 14, wherein execution of the one or more sequences of instructions by one or more processors causes the one or more processors to perform the step of:
  maintaining, in association with the first cache, data that defines a sub-range of the sequence of unique values.

16. The computer-readable medium of claim 14, wherein the first and second processes are associated with a database instance that has established a cache of a representation of values from a sequence of unique values, wherein the sequence of unique values is shared with at least one other database instance, and wherein the steps of populating the first process-level cache and the second process-level cache include populating the first process-level cache and the second process-level cache from the database instance cache.

17. The computer-readable medium of claim 14, wherein execution of the one or more sequences of instructions by one or more processors causes the one or more processors to perform the step of:
computing a first cache size, the first cache size indicating a range of the first set of unique values represented in the first process-level cache.

18. The computer-readable medium of claim 14, wherein execution of the one or more sequences of instructions by one or more processors causes the one or more processors to perform the step of:
computing a first cache size, the first cache size indicating a range of the first set of unique values for populating the first process-level cache, wherein the first cache size is computed as a function of the instance-level cache size and the number of processes of the plurality of processes, wherein the instance-level cache is associated with a database instance in which the parallel operation is executing and which maintains the sequence of unique values from which the first process-level cache is populated.

19. The computer-readable medium of claim 14, wherein execution of the one or more sequences of instructions by one or more processors causes the one or more processors to perform the step of:
computing a first cache size, the first cache size indicating a range of the first set of unique values for populating the first process-level cache, wherein the first cache size is computed as a function of a cardinality associated with a table on which the parallel operation is executing and the number of processes of the plurality of processes.

20. The computer-readable medium of claim 14, wherein execution of the one or more sequences of instructions by one or more processors causes the one or more processors to perform the step of:
computing a first cache size, the first cache size indicating a range of the first set of unique values for populating the first process-level cache, wherein the first cache size is computed as a function of the instance-level cache size, a cardinality associated with a table on which the parallel operation is executing, and the number of processes of the plurality of processes, wherein the instance-level cache is associated with a database instance in which the parallel operation is executing and maintains the sequence of unique values from which the first process-level cache is populated.

21. The computer-readable medium of claim 14, wherein the step of populating the first process-level cache is performed again each time the first process-level cache of a representation of unique values is exhausted, the method further comprising the steps of:
computing a first cache size, the first cache size indicating a range of the first set of values for populating the first process-level cache, by
specifying a baseline first cache size;
determining, for a number of populations of the first process-level cache, how long it takes to populate each respective first process-level cache;
determining whether how long it takes to populate each respective first process-level cache is increasing or decreasing for the number of populations of the first process-level cache; and if how long it takes to populate each respective first process-level cache is increasing, then specifying the first cache size that is larger than the baseline first cache size; else
if how long it takes to populate each respective first process-level cache is decreasing, then specifying the first cache size that is smaller than the baseline first cache size.

22. The computer-readable medium of claim 14, wherein the step of populating the first process-level cache is performed again each time the first process-level cache of a representation of unique values is exhausted, the method further comprising the steps of:
computing a first cache size, the first cache size indicating a range of the first set of values for populating the first process-level cache, by
specifying a baseline first cache size;
determining, for N establishments of the first process-level cache, how long it takes to populate each respective first process-level cache;
computing an average of how long it takes to populate each respective first process-level cache for the N previous populations, after each additional X populations of the first process-level cache;
determining whether the averages are increasing or decreasing for Y computations of the average; and
if the averages are increasing for the Y computations, specifying the first cache size that is larger than the baseline first cache size; else
if the averages are decreasing for the Y computations, then specifying the first cache size that is smaller than the baseline first cache size.

23. The computer-readable medium of claim 14, wherein execution of the one or more sequences of instructions by one or more processors causes the one or more processors to perform the steps of:
in response to determining that the first process-level cache does not have any unused values represented,
obtaining the instance-level lock on the instance-level cache, and
once the instance-level lock is obtained, obtaining a representation of a plurality of values from the sequence of unique values for re-populating the first process-level cache.

24. The computer-readable medium of claim 14, wherein execution of the one or more sequences of instructions by one or more processors causes the one or more processors to perform the step of populating the first process-level cache with a representation of the first set of unique values by storing within the first process-level cache the first set of unique values.

25. The computer-readable medium of claim 14, wherein execution of the one or more sequences of instructions by one or more processors causes the one or more processors to perform the step of populating the first process-level cache with a representation of the first set of unique values by storing within the first process-level cache data that defines the first set of unique values.

26. A computer apparatus, comprising:
a memory; and
one or more processors coupled to the memory and configured to execute one or more sequence of instructions for processing sequence operations, wherein execution of the one or more sequences of instructions by one or more processors causes the one or more processors to perform the steps of:

during execution of a parallel operation performed by a plurality of processes from a single database instance,
  in response to a request from a first process for a value from a sequence of unique values, populating a first process-level cache with a representation of a first set of unique values from the sequence of unique values;
  wherein populating the first process-level cache includes obtaining an instance-level lock on an instance-level cache that stores, for all processes of the instance, a representation of the sequence of unique values;
  when a first process of the plurality of processes requires a value from the sequence of unique values, the first process obtaining, based on the representation in the first cache, a value that has not previously been provided to the first process;
  wherein the first process-level cache is used exclusively for storing values representing the first set of unique values for use by the first process;
  populating a second process-level cache with a representation of a second set of unique values from the sequence of unique values, the second cache being different than the first cache;
  wherein populating the second process-level cache includes obtaining an instance-level lock on the instance-level cache; and
  when a second process of the plurality of processes requires a value from the sequence of values, the second process obtaining, based on the representation in the second cache, a value that has not previously been provided to the second process;
  wherein the second process-level cache is used exclusively for storing values representing the second set of unique values for use by the second process.

* * * * *